US012159741B2

(12) United States Patent
Kojo et al.

(10) Patent No.: US 12,159,741 B2
(45) Date of Patent: Dec. 3, 2024

(54) COIL COMPONENT

(71) Applicant: TAIYO YUDEN CO., LTD., Tokyo (JP)

(72) Inventors: Shinichi Kojo, Tokyo (JP); Tomoo Kashiwa, Tokyo (JP); Syunichi Ohno, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 227 days.

(21) Appl. No.: 17/241,665

(22) Filed: Apr. 27, 2021

(65) Prior Publication Data

US 2021/0335534 A1 Oct. 28, 2021

(30) Foreign Application Priority Data

Apr. 28, 2020 (JP) ................................ 2020-079655

(51) Int. Cl.
*H01F 27/29* (2006.01)
*H01F 27/255* (2006.01)

(52) U.S. Cl.
CPC ......... *H01F 27/292* (2013.01); *H01F 27/255* (2013.01)

(58) Field of Classification Search
CPC ................. H01F 17/0013; H01F 17/04; H01F 2017/048; H01F 27/255; H01F 27/292
See application file for complete search history.

(56) References Cited

U.S. PATENT DOCUMENTS

2012/0274438 A1 11/2012 Hachiya et al.
2020/0168391 A1* 5/2020 Yang .................. H01F 17/0013

FOREIGN PATENT DOCUMENTS

JP 2007-027354 A 2/2007
JP 2012-238840 A 12/2012

* cited by examiner

*Primary Examiner* — Holly Rickman
*Assistant Examiner* — Linda N Chau
(74) *Attorney, Agent, or Firm* — Pillsbury Winthrop Shaw Pittman, LLP

(57) ABSTRACT

According to one or more embodiments of the present invention, a coil element includes a base body, an internal conductor provided within the base body, a first external electrode electrically connected to one of ends of the internal conductor, and a second external electrode electrically connected to the other end of the internal conductor. The base body contains a plurality of metal magnetic particles, a resin portion between the metal magnetic particles and a void. The base body includes a first region and a second region surrounding the first region, and a second area void ratio of the second region is higher than a first area void ratio of the first region. The internal conductor is provided in the first region of the base body.

12 Claims, 8 Drawing Sheets

COIL COMPONENT

CROSS-REFERENCE TO RELATED APPLICATIONS

This application is based on and claims the benefit of priority from Japanese Patent Application Serial No. 2020-079655 (filed on Apr. 28, 2020), the contents of which are hereby incorporated by reference in its entirety.

TECHNICAL FIELD

The present invention relates to a coil component.

BACKGROUND

There are conventional coil components including a magnetic base body formed of a magnetic material, an external electrode provided on the surface of the magnetic base body, and an internal conductor provided in the magnetic base body and electrically connected to the external electrode.

Various magnetic materials have been used to form the magnetic base body of the coil component. Ferrite is, for example, widely used as the magnetic material for the coil component. Ferrite is suitable as the magnetic material for the base body of the coil component because of its high magnetic permeability.

Other than ferrite, metal magnetic materials containing metal magnetic particles are known as the magnetic material for electronic components. Since the metal magnetic materials exhibit higher saturation magnetic flux density than ferrite, the coil components including a base body containing the metal magnetic particles exhibit excellent DC superimposition characteristics. In the case of a base body made of a ferrite material, ferrite particles are fired and gaps can be present between the resulting grain boundaries. This may allow foreign matters such as water to intrude into the base body from outside. When the metal magnetic material is used to fabricate the base body, the gaps between the adjacent metal magnetic particles are several times as large as those found in the base body made of the ferrite material. This means that a considerably larger amount of foreign matters such as water intrude from outside into the gaps in the base body containing the metal magnetic particles, when compared with the case where the base body is made of ferrite. If such a large amount of foreign matters fills the gaps between the metal magnetic particles, this may inadvertently affect the insulation reliability and magnetic characteristics of the base body. In addition, larger gaps included in the base body can in turn lower the strength of the base body.

In known coil components, the gaps between the metal magnetic particles are filled with a resin in order to prevent foreign matters from intruding into the base body and to enhance the strength of the base body. Such a coil component is disclosed in Japanese Patent Application Publications Nos. 2007-027354 and 2012-238840. The resin is typically injected through impregnation to fill the gaps between the metal magnetic particles in the base body.

When injected into the base body through impregnation, the resin wets the metal magnetic particles and spreads along the surface of the metal magnetic particles. This resultantly forms a resin film on the surface of the metal magnetic particles in the base body. The conventional impregnation process suffers from the following drawbacks. If only a small amount of the resin is injected, the resin film does not sufficiently close the gaps between the metal magnetic particles and foreign matters can not be sufficiently prevented from intruding into the base body from outside. On the other hand, if a sufficient amount of the resin is injected to prevent foreign matters from intruding from outside, the resin overflows onto the outer surface of the base body. This causes the resin to inadvertently be present on the outer surface of the base body. The resin present on the outer surface of the base body can contribute to disruption of the electrical continuity between the external electrode and the internal conductor. Furthermore, the resin present on the surface of the base body of the coil component may cause other coil components to adhere to this defective coil component during the manufacturing process.

SUMMARY

One of the objectives of the invention disclosed herein is to solve or alleviate the above drawback of the conventional coil component. More specifically, the present invention aims to provide a coil component that is capable of preventing foreign matters from intruding between the metal magnetic particles with a reduced amount of resin being left on the outer surface of the base body. Other objects of the present invention will be made apparent through the entire description in the specification. The invention disclosed herein may solve any other drawbacks grasped from the following description, instead of or in addition to the above drawback.

According to one or more embodiments of the present invention, a coil element includes a base body, an internal conductor provided within the base body, a first external electrode electrically connected to one of ends of the internal conductor, and a second external electrode electrically connected to the other end of the internal conductor. In one or more embodiments of the present invention, the base body contains a plurality of metal magnetic particles, a resin portion between the metal magnetic particles and a void. In one or more embodiments of the present invention, the base body includes a first region and a second region surrounding the first region, where a second area void ratio of the second region being higher than a first area void ratio of the first region. In one or more embodiments of the present invention, the internal conductor is provided in the first region of the base body.

In the coil component relating to one or more embodiments of the present invention, the internal conductor extends around a coil axis. The internal conductor includes a first conductor pattern and a second conductor pattern facing the first conductor pattern in a direction along the coil axis. In one or more embodiments of the present invention, the first region of the base body includes an inter-conductor region between the first conductor pattern and the second conductor pattern. In one or more embodiments of the present invention, a second area void ratio of the second region of the base body is higher than a first area void ratio of the inter-conductor region.

In one or more embodiments of the present invention, a space between the metal magnetic particles in the first region in a cross-section passing through the internal conductor has a smaller area than a space between the metal magnetic particles in the second region in the cross-section.

In one or more embodiments of the present invention, the base body includes a third region having a third area void ratio higher than the second area void ratio, and the third region defines at least a part of an outer surface of the base body.

In one or more embodiments of the present invention, the base body includes a third region having a third area void ratio higher than the first area void ratio and lower than the second area void ratio.

In one or more embodiments of the present invention, the metal magnetic particles contain an oxide of an element constituting the metal magnetic particles.

In one or more embodiments of the present invention, an amount of a resin per unit volume is greater in the first region than in the second region.

A circuit board relating to one or more embodiments of the present invention includes at least one coil component described above.

An electronic device relating to one or more embodiments of the present invention includes the above-described circuit board.

Advantageous Effects

One or more embodiments of the present invention provide a coil component that is capable of preventing foreign matters from intruding into the gaps between the metal magnetic particles with a reduced amount of resin being left on the outer surface of the base body.

DESCRIPTION OF THE PREFERRED EMBODIMENTS

The following describes various embodiments of the present invention by referring to the appended drawings as appropriate. The constituents common to more than one drawing are denoted by the same reference signs throughout the drawings. It should be noted that the drawings do not necessarily appear to an accurate scale for the sake of convenience of explanation.

Figure 1:
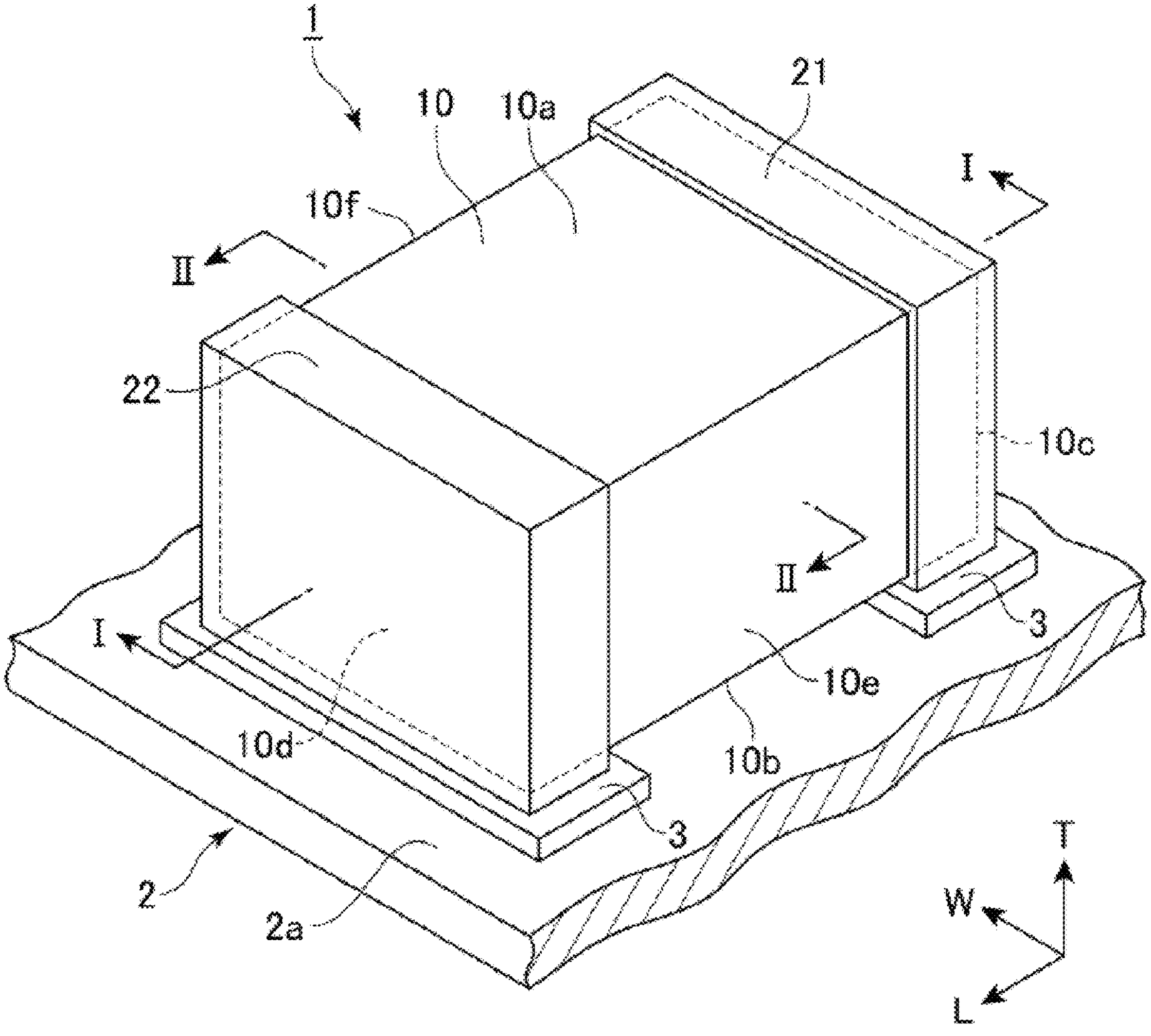
FIG. 1 is a perspective view showing a coil component relating to an embodiment of the invention.
Figure 2:
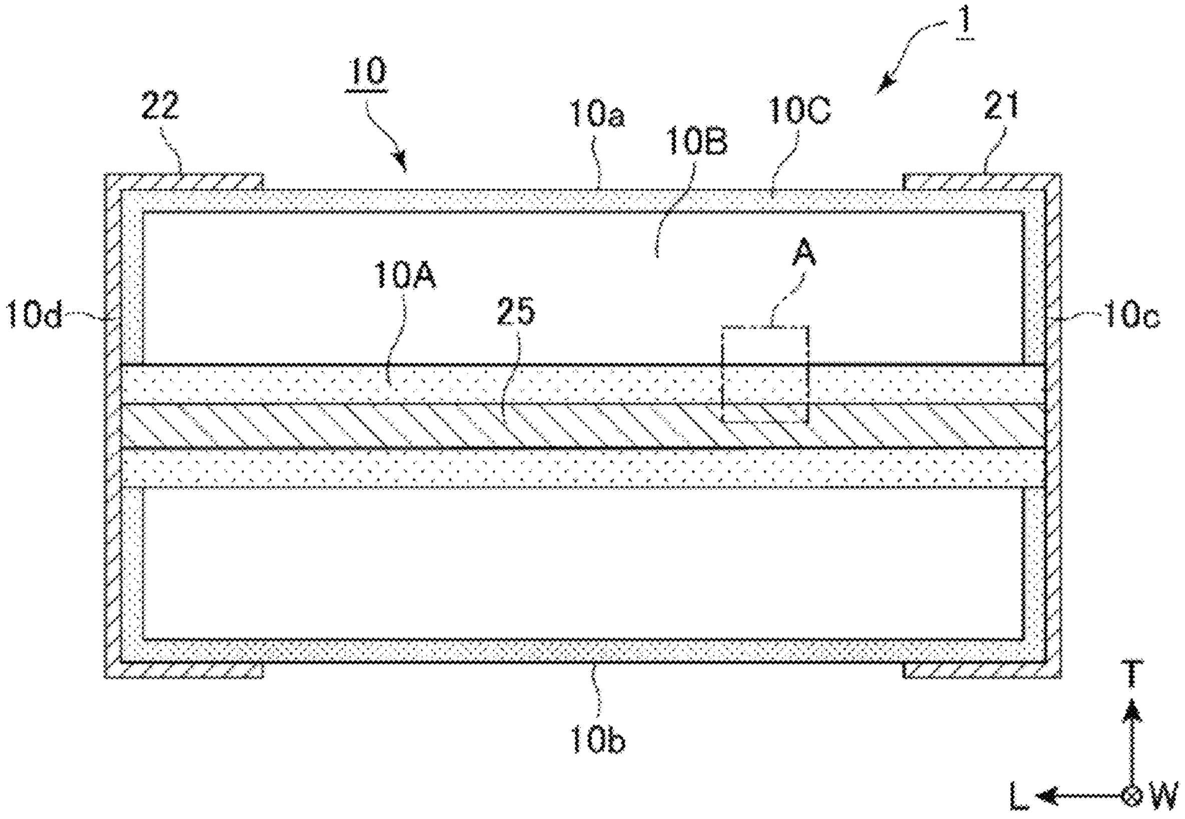
FIG. 2 schematically shows a cross-section of the coil component along the line I-I in FIG. 1.
Figure 3:
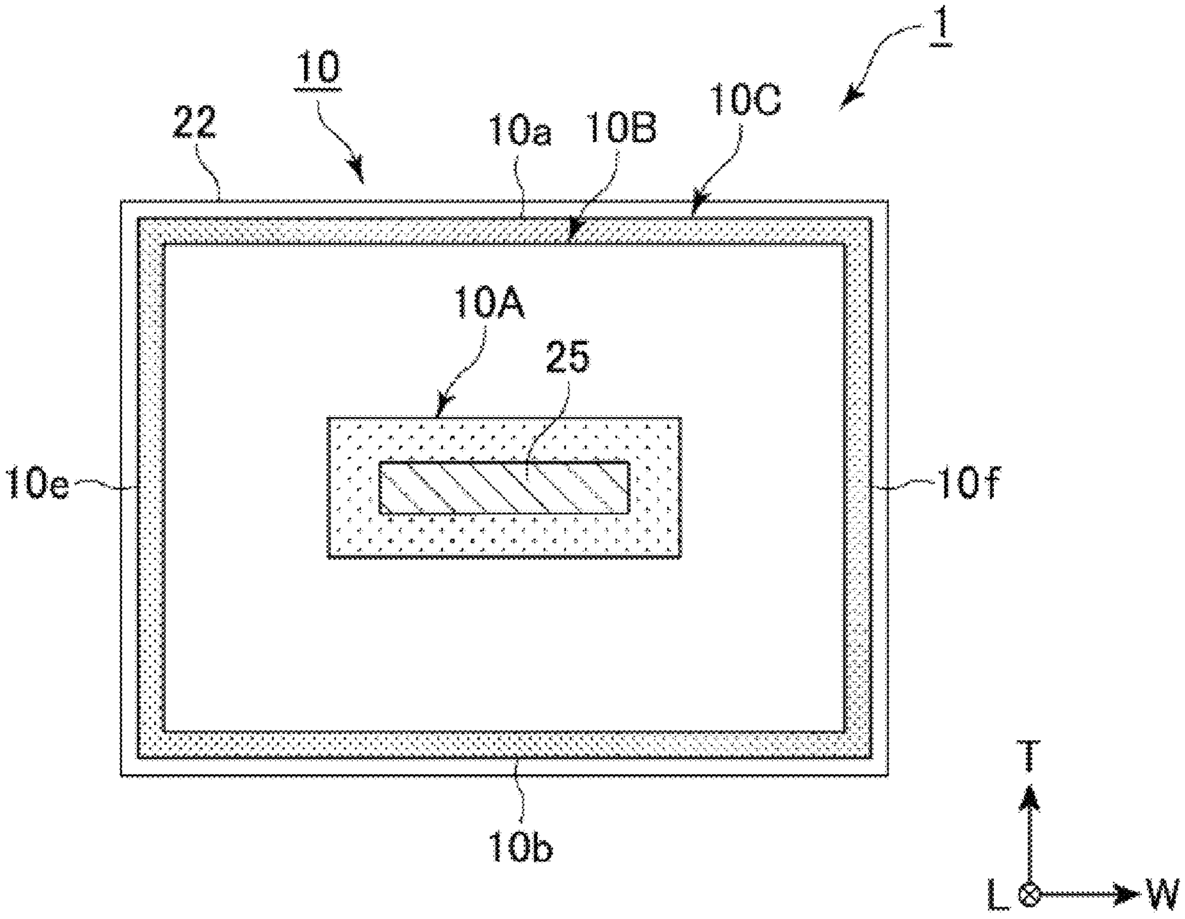
FIG. 3 schematically shows a cross-section of the coil component along the line II-II in FIG. 1.
Figure 4:
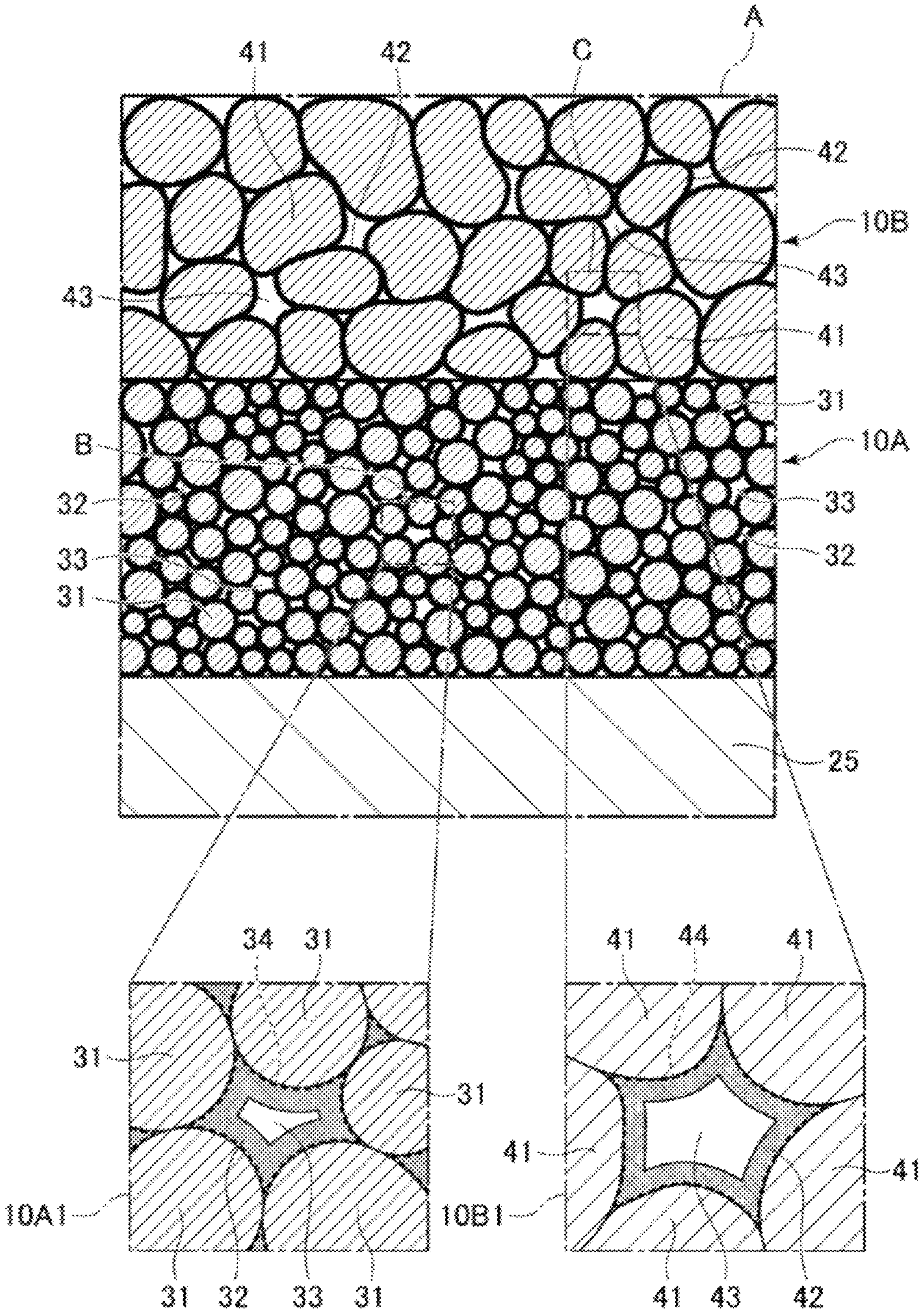
FIG. 4 is an enlarged cross-sectional view of a region A in a base body 10.

A coil component 1 according to one embodiment of the present invention will be hereinafter described with reference to FIGS. 1 to 4. FIG. 1 is a perspective view of the coil component 1 according to one embodiment of the present invention, and FIGS. 2 and 3 schematically show the cross-sections of the coil component 1 along the lines I-I and II-II in FIG. 1 respectively. FIG. 4 is an enlarged cross-sectional view showing, on an enlarged scale, a part of the cross-section of the coil component 1 shown in FIG. 2.

These drawings show, as one example of the coil component 1, a bead inductor. The present invention may be applied to various coil components, in addition to the bead inductor illustrated in the drawings. The coil component 1, which can be worked with the present invention, may be any one of various types of inductors other than a bead inductor, transformers, filters, reactors, and various other coil components. The coil component 1 may alternatively be used as a coupled inductor, a choke coil, and any one of various other magnetically coupled coil components. The coil component 1 may be, for example, an inductor used in a DC/DC converter. Applications of the coil component 1 are not limited to those explicitly described herein.

The coil component 1 is mounted on a mounting substrate 2*a*. The coil component 1 and the mounting substrate 2*a* form a part of a circuit board 2. In other words, the circuit board 2 includes the coil component 1 and the mounting substrate 2*a* having the coil component 1 mounted thereon. The mounting substrate 2*a* has two land portions 3 provided thereon. The coil component 1 is mounted on the mounting substrate 2*a* by bonding the external electrodes 21 and 22 to the corresponding land portions 3 of the mounting substrate 2*a*. The circuit board 2 can be installed in various electronic devices. The electronic devices in which the circuit board 2 may be installed include smartphones, tablets, game consoles, electrical components of automobiles, and various other electronic devices.

The coil component 1 in the embodiment shown includes a base body 10 containing a plurality of metal magnetic particles, an internal conductor 25 disposed in the base body 10, an external electrode 21 electrically connected to one of the ends of the internal conductor 25, and an external electrode 22 electrically connected to the other end of the internal conductor 25.

In this specification, a "length" direction, a "width" direction, and a "thickness" direction of the coil component 1 are referred to as an "L axis" direction, a "W axis" direction, and a "T axis" direction in FIG. 1, respectively, unless otherwise construed from the context.

The base body 10 is made of a magnetic material and formed in a rectangular parallelepiped shape as a whole. In one embodiment of the invention, the base body 10 has a length (the dimension in the L axis direction) of 1.6 to 4.5 mm, a width (the dimension in the W axis direction) of 0.8 to 3.2 mm, and a thickness (the dimension in the T axis direction) of 0.8 to 5.0 mm. The dimensions of the base body 10 are not limited to those specified herein. The term "rectangular parallelepiped" or "rectangular parallelepiped shape" used herein is not intended to mean solely "rectangular parallelepiped" in a mathematically strict sense.

The base body 10 has a first principal surface 10*a*, a second principal surface 10*b*, a first end surface 10*c*, a second end surface 10*d*, a first side surface 10*e*, and a second side surface 10*f*. These six surfaces define the outer periphery of the base body 10. The first principal surface 10*a* and the second principal surface 10*b* are at the opposite ends in the thickness direction, the first end surface 10*c* and the second end surface 10*d* are at the opposite ends in the length direction, and the first side surface 10*e* and the second side surface 10*f* are at the opposite ends in the width direction.

As shown in FIG. 1, the first principal surface 10*a* lies on the top side of the base body 10, and therefore, the first principal surface 10*a* may be herein referred to as "the top surface." Similarly, the second principal surface 10*b* may be referred to as "the bottom surface." The coil component 1 is disposed such that the second principal surface 10*b* faces the mounting substrate 2*a*, and therefore, the second principal surface 10*b* may be herein referred to as "the mounting surface." The top-bottom direction of the coil component 1 mentioned herein may refer to the top-bottom direction in FIG. 1.

In one or more embodiments of the present invention, the external electrodes 21 and 22 are provided on the surface of the base body 10. The external electrodes 21 and 22 are separated from each other in the length direction. Specifically, the external electrode 21 extends on a part of the first principal surface 10*a*, the second principal surface 10*b*, the first end surface 10*c*, the first side surface 10*e*, and the second side surface 10*f* of the base body 10, and the external electrode 22 extends on a part of the first principal surface 10*a*, the second principal surface 10*b*, the second end surface 10*d*, the first side surface 10*e*, and the second side surface 10*f* of the base body 10. The shapes and positions of the external electrodes 21 and 22 are not limited to those in the example shown. For example, at least one of the external electrodes 21 and 22 may not include a flange portion extending along the first and second side surfaces 10*e* and 10*f* of the base body 10.

In one or more embodiments, the base body 10 contains a plurality of metal magnetic particles and a resin portion in gaps between the metal magnetic particles. In one or more embodiments, the base body 10 is made of a composite magnetic material containing a plurality of metal magnetic particles and a binder resin. The metal magnetic particles may be a particle mixture obtained by mixing together a plurality of types of metal magnetic particles having different average particle sizes. When the metal magnetic particles include large-diameter metal magnetic particles and small-diameter metal magnetic particles, the average particle size of the large-diameter metal magnetic particles is, for example, 10 μm, and the average particle size of the small-diameter metal magnetic particles is, for example, 1 μm. The binder resin serves to bind the plurality of metal magnetic particles to each other. The binder resin is a highly insulating thermosetting resin, for example. The base body 10 may be a compact in which the metal magnetic particles are bonded to each other without using the binder resin.

As shown in FIGS. 2 and 3, in one or more embodiments, the base body 10 includes a first region 10A, a second region 10B and a third region 10C. In one or more embodiments, the second region 10B surrounds the first region 10A. In other words, the second region 10B is positioned outside the first region 10A. In one or more embodiments, the inner surface of the second region 10B is in contact with the outer surface of the first region 10A. In one or more embodiments, the third region 10C covers the second region 10B. In other words, the third region 10C is positioned outside the second region 10B. In one or more embodiments, the inner surface of the third region 10C is in contact with the outer surface of the second region 10B. In the embodiment illustrated, the third region 10C defines a large part of the outer surface of the base body 10. In the embodiment illustrated, the first region 10A partially penetrates through the second and third regions 10B and 10C, to be exposed through the third region 10C.

In one or more embodiments, the internal conductor 25 is provided within the base body 10. In the embodiment shown, the internal conductor 25 is provided in the first region 10A of the base body 10. The internal conductor 25 is exposed at one end thereof to the outside of the base body 10 through the first end surface 10*c* and is connected to the external electrode 21 at the one end. Furthermore, the internal conductor 25 is exposed at the other end thereof to the outside of the base body 10 through the second end surface 10*d* and is connected to the external electrode 22 at the other end. In this manner, the internal conductor 25 is connected at one end thereof to the external electrode 21 and connected at the other end thereof to the external electrode 22.

In one or more embodiments, the internal conductor 25 extends linearly from the external electrode 21 to the external electrode 22 in a plan view (as viewed from the L axis). Stated differently, the internal conductor 25 has no separate parts facing each other in the base body 10 in a plan view. Herein, when the internal conductor 25 has no separate parts facing each other in the base body 10 in a plan view, this can mean the internal conductor 25 extends linearly from the external electrode 21 to the external electrode 22. In the embodiment shown, the internal conductor 25 has a rectangular parallelepiped shape. The internal conductor 25 may be formed by only a single conductor pattern or by a plurality of conductor patterns electrically insulated from each other in the base body 10. When the internal conductor 25 is formed by a plurality of conductor patterns, the respective conductor patterns have the same shape and adjacent ones of the conductor patterns are separated from each other by a part of the first region 10A of the base body 10.

As described above, the base body 10 contains a plurality of metal magnetic particles. In one or more embodiments, the base body 10 can be made in the following manner. The metal magnetic particles are mixed and kneaded with a binder resin and a solvent to produce a magnetic paste. The magnetic paste is shaped into a sheet so that magnetic sheets are made. These magnetic sheets are stacked on each other to make a laminated body, which is heated into a starting body. The starting body is then impregnated with a resin. In this way, the base body 10 can be made. This means that the base body 10 includes a resin portion made of the resin.

The base body 10 will be further described with reference to FIG. 4. FIG. 4 is an enlarged cross-sectional view of a region A of the coil component 1. The region A occupies a part of the cross-section of the coil component 1, and extends over a part of the internal conductor 25, a part of the first region 10A of the base body 10 and a part of the second region 10B of the base body 10. In the embodiment shown in FIG. 4, the base body 10 contains a plurality of metal magnetic particles 31 and a plurality of metal magnetic particles 41. The metal magnetic particles 31 are present in the first region 10A, and the metal magnetic particles 41 are present in the second region 10B. The metal magnetic particles 31 and 41 may be particles of the same or different types. In one or more embodiments, the average particle size of the metal magnetic particles 31 is smaller than that of the metal magnetic particles 41. The average particle size of the metal magnetic particles (including the metal magnetic particles 31 and 41) contained in the base body 10 is determined based on a particle size distribution. To determine the particle size distribution, the magnetic base body 10 is cut along the thickness direction (T direction) to expose a cross-section, and the cross-section is scanned by a scanning electron microscope (SEM) to take a photograph at a 2000 to 5000-fold magnification, and the particle size distribution is determined based on the photograph. For example, the value at 50 percent of the particle size distribution determined based on the SEM photograph can be set as the average particle size of the metal magnetic particles.

The metal magnetic particles 31 may be a particle mixture obtained by mixing together a plurality of types of particles having different average particle sizes. In other words, the first region 10A may contain a plurality of types of metal magnetic particles having different average particle sizes.

Likewise, the metal magnetic particles 41 may be a particle mixture obtained by mixing together a plurality of types of particles having different average particle sizes. In other words, the second region 10B may contain a plurality of types of metal magnetic particles having different average particle sizes.

Although not included in the region A, the third region 10C may also contain a plurality of metal magnetic particles, similarly to the first and second regions 10A and 10B.

The metal magnetic particles (including the metal magnetic particles 31, 41) in the base body 10 are particles of various soft magnetic materials. For example, the main ingredient of the metal magnetic particles is Fe. Specifically, the metal magnetic particles contained in the base body 10 are particles of (1) a metal such as Fe or Ni, (2) a crystalline alloy such as an Fe—Si—Cr alloy, an Fe—Si—Al alloy, or an Fe—Ni alloy, (3) an amorphous alloy such as an Fe—Si—Cr—B—C alloy or an Fe—Si—Cr—B alloy, or (4) a mixture thereof. The composition of the metal magnetic particles contained in the base body 10 is not limited to those described above.

The metal magnetic particles may each have an oxide film (not shown) formed on the surface thereof. The oxide film on the surface of the metal magnetic particle includes an oxide of the elements constituting the metal magnetic particles. For example, the oxide film can be, for example, $Fe_2O_3$, $SiO_2$, CrO or other oxides. The metal magnetic particles may each have an insulating coating film (not shown) formed on the surface thereof. The coating film is an insulating film made of glass, a resin, or any other highly insulating materials.

FIG. 4 shows an enlarged cross-section of a unit region 10A1 in the first region 10A and an enlarged cross-section of a unit region 10B1 in the second region 10B. As shown in these enlarged cross-sectional views, gaps are present between the metal magnetic particles in the base body 10, and a resin fills the gaps. The unit regions 10A1 and 10B1 have the same shape and size. For example, the unit regions 10A1 and 10B1 are a square region of 10 μm×10 μm. As shown in the enlarged view of the unit region 10A1, gaps 34 are present between the metal magnetic particles 31 in the first region 10A, and a resin portion 32 is provided in the gaps 34. Likewise, gaps 44 are present between the metal magnetic particles 41 in the second region 10B, and a resin portion 42 is provided in the gaps 44. Although not shown in these enlarged cross-sectional views, a resin portion is also provided in the gaps present between the metal magnetic particles in the third region 10C. As used herein, the gaps between the metal magnetic particles indicate the spaces between the metal magnetic particles that can be filled with resins.

In one or more embodiments, in the cross-section obtained by cutting the base body 10 along the thickness direction and through the internal conductor 25, the gaps 34 between the metal magnetic particles 31 in the first region 10A each have a smaller area than the gaps 44 between the metal magnetic particles 41 in the second region 10B. Likewise, in the cross-section exposed and obtained by cutting the base body 10 along the thickness direction, the gaps 34 between the metal magnetic particles 31 in the first region 10A have a smaller area than the gaps, which are not shown in the drawings, between the metal magnetic particles in the third region 10C. The area of the gaps 34 between the metal magnetic particles 31 in the first region 10A can be compared against the area of the gaps 44 between the metal magnetic particles 41 in the second region 10B in the following manner to determine which one is larger. A plurality of (for example, five) unit regions, which each correspond to the unit region 10A1, are defined in the first region 10A and the average of the areas of the respective gaps 34 in the unit regions is calculated. Likewise, a plurality of (for example, five) unit regions, which each correspond to the unit region 10B1, are defined in the second region 10B and the average of the areas of the respective gaps 44 in the unit regions is calculated. The resulting average areas are compared against each other. The area of the gaps 34 between the metal magnetic particles 31 in the first region 10A can be compared against the area of the gaps between the metal magnetic particles in the third region 10C in the same manner.

In order to allow the gaps 34 between the metal magnetic particles 31 in the first region 10A to have a smaller area than the gaps 44 between the metal magnetic particles 41 in the second region 10B, various techniques can be used. The example techniques are explained in the following.

The first technique is as follows. The gaps 34 between the metal magnetic particles 31 in the first region 10A can have a smaller area than the gaps 44 between the metal magnetic particles 41 in the second region 10B if the content ratio of the binder resin in the magnetic paste used to make the first region 10A is lower than the content ratio of the binder resin in the magnetic paste used to make the second region 10B. The base body 10 is principally made up by metal magnetic particles, which hardly experience a change in particle size through thermal treatment, differently from conventional materials such as ferrite. For this reason, if the content ratio of the binder resin in the magnetic paste is set smaller, the gaps between the metal magnetic particles 31 in the first region 10A, at the time prior to the thermal treatment, can be smaller than the gaps between the metal magnetic particles 41 in the second region 10B. In this manner, after the thermal treatment, the gaps 34 between the metal magnetic particles 31 in the first region 10A can have a smaller area than the gaps 44 between the metal magnetic particles 41 in the second region 10B. In one or more embodiments, the metal magnetic particles 31 used in the first region 10A have the same average particle size as the metal magnetic particles 41 used in the second region 10B. In this way, the content ratio of the binder resin can determine the gaps 34 between the metal magnetic particles 31 in the first region 10A and the gaps 44 between the metal magnetic particles 41 in the second region 10B.

The second technique is as follows. The gaps 34 between the metal magnetic particles 31 in the first region 10A can have a smaller area than the gaps 44 between the metal magnetic particles 41 in the second region 10B if higher shaping pressure is applied to shape the first region 10A (or magnetic sheets making up the first region 10A) than to mold the second region 10B (or magnetic sheets making up the second region 10B). For example, the gaps 34 can be made smaller than the gaps 44 by performing the shaping process of the base body 10 in more than one step. More specifically, the source material for the first region 10A (for example, a magnetic paste) is shaped with a first shaping pressure. After this, the source material for the second region 10B (for example, a magnetic paste) is supplied such that it surrounds the shaped body corresponding to the first region 10A, which has been shaped with the first shaping pressure, and shaped with a second shaping pressure lower than the first shaping pressure. In this manner, the gaps 34 between the metal magnetic particles 31 in the first region 10A can have a smaller area than the gaps 44 between the metal magnetic particles 41 in the second region 10B. When the base body 10 is made from a plurality of magnetic sheets, a magnetic sheet for forming the first region 10A is shaped with a first shaping pressure, and a magnetic sheet for forming the second region 10B is shaped with a second shaping pressure lower than the first shaping pressure. These magnetic sheets that have been made with different shaping pressure levels are stacked on each other to make the base body 10. In this way, the gaps 34 between the metal magnetic particles 31 in the first region 10A can have a smaller area than the gaps 44 between the metal magnetic particles 41 in the second region 10B. As described above, the particle size of the metal magnetic particles hardly experiences a change over the thermal treatment. Accordingly, prior to the thermal treatment, different shaping pressure levels are applied so that smaller gaps are made between the metal magnetic particles 31 in the first region 10A than between the metal magnetic particles 41. In this manner, after the thermal treatment, the gaps 34 between the metal magnetic particles 31 in the first region 10A can still have a smaller area than the gaps 44 between the metal magnetic particles 41 in the second region 10B.

The third technique is as follows. The particles used as the metal magnetic particles 31 in the first region 10A are more deformable than the particles used as the metal magnetic particles 41 in the second region 10B. In this manner, the gaps 34 between the metal magnetic particles 31 in the first region 10A can have a smaller area than the gaps 44 between the metal magnetic particles 41 in the second region 10B. This is because, when pressured is applied, the metal magnetic particles 31 are deformed more greatly, so that the gaps between the metal magnetic particles 31 are taken up. For example, metal magnetic particles having a high content ratio of silicon (Si) are generally harder than metal magnetic particles having a low content ratio of Si and are less deformable. If the content ratio of silicon (Si) to iron (Fe) is lower in the metal magnetic particles 31 than in the metal magnetic particles 41, the metal magnetic particles 31 are more deformable than the metal magnetic particles 41. As described above, thermal treatment hardly changes the particle size of the metal magnetic particles. For this reason, if the metal magnetic particles 31 are deformed more greatly than the metal magnetic particles 41 during the compression shaping prior to the thermal treatment, the gaps between the metal magnetic particles 31 in the first region 10A can have a smaller area than the gaps between the metal magnetic particles 41 in the second region 10B. In this manner, after the thermal treatment, the gaps 34 between the metal magnetic particles 31 in the first region 10A of the base body 10 can have a smaller area than the gaps 44 between the metal magnetic particles 41 in the second region 10B.

The fourth technique is as follows. From the perspective of the composition, the particles used as the metal magnetic particles 31 in the first region 10A are more susceptible to oxidation than the particles used as the metal magnetic particles 41 in the second region 10B. In this manner, the gaps 34 between the metal magnetic particles 31 in the first region 10A can have a smaller area than the gaps 44 between the metal magnetic particles 41 in the second region 10B. This is explained in the following. During the process of making the coil component 1, more oxides are produced on the surface of the metal magnetic particles 31 when the metal magnetic particles 31 are heated during the thermal treatment and the produced oxides can fill the gaps that are present before the thermal treatment between the metal magnetic particles 31. For example, metal magnetic particles having a higher iron (Fe) content ratio are generally more susceptible to oxidation. In addition, oxidation of iron (Fe) is more encouraged in the case of metal magnetic particles having a low content ratio of silicon (Si), zirconium (Zr), chromium (Cr), aluminum (Al) or other metal elements that are more susceptible to oxidation than iron. Accordingly, if the iron (Fe) content ratio is lower in the metal magnetic particles 41 than in the metal magnetic particles 31 and/or if a content ratio of silicon (Si), zirconium (Zr), chromium (Cr), aluminum (Al) or other metal elements that are more susceptible to oxidation than iron is higher in the metal magnetic particles 41 than in the metal magnetic particles 31, the metal magnetic particles 31 are more susceptible to oxidation than the metal magnetic particles 41.

The fifth technique is as follows. Filler particles are arranged between the metal magnetic particles 31 in the first region 10A. In this manner, the gaps 34 between the metal magnetic particles 31 in the first region 10A can have a smaller area than the gaps 44 between the metal magnetic particles 41 in the second region 10B. Such filler particles arranged between the metal magnetic particles 31 can reduce the spaces between the metal magnetic particles 31 that can be filled with a resin. In this way, filler particles can reduce the area of the gaps 34 between the metal magnetic particles 31. The filler particles can be particles of magnetic or non-magnetic materials. The filler particles may be arranged not only between the metal magnetic particles 31 but also between the metal magnetic particles 41. If such is the case, in a cross-sectional view, the filler particles arranged between the metal magnetic particles 41 have a smaller area than the filler particles arranged between the metal magnetic particles 31. In order to arrange the filler particles between the metal magnetic particles 31 in the first region 10A, the filler particles may be mixed in the source material (for example, a magnetic paste) for forming the first region 10A. Likewise, in order to arrange the filler particles between the metal magnetic particles 41 in the second region 10B, the filler particles may be mixed in the source material (for example, a magnetic paste) for forming the second region 10B. If a suitably adjusted amount of the filler particles is mixed with the source materials of the first and second regions 10A and 10B, the filler particles arranged between the metal magnetic particles 41 can have a smaller area than the filler particles arranged between the metal magnetic particles 31.

The following now describes the resin portion in the gaps between the metal magnetic particles. As mentioned above, the resin portion 32 is provided in the gaps 34 between the metal magnetic particles 31, and the resin portion 42 is provided in the gaps 44 between the metal magnetic particles 41. In one or more embodiments, the resin portion in the base body 10, which includes the resin portions 32 and 42, is formed by introducing a resin into the gaps between the metal magnetic particles through impregnation. The resin portion in the base body 10 is formed of at least one selected from the group consisting of, for example, silicone-based resins, epoxy-based resins, acrylic-based resins, phenol-based resins, imide-based resins, amide-based resins, silicate-based resins, urethane-based resins, polyester-based resins, and polyethylene-based resins.

The resin introduced between the metal magnetic particles 31 and between the metal magnetic particles 41 wets the metal magnetic particles 31 and 41 and spreads between the metal magnetic particles 31 and along the surface of the metal magnetic particles 41, thereby filling the gaps 34 between the metal magnetic particles 31 and the gaps 44 between the metal magnetic particles 41. The resin portions 32 and 42 are formed on the surface of the metal magnetic particles 31 and 41 at a thickness determined by the viscosity of the injected resin and other factors. If the resin solution before curing has a too low viscosity, its high wettability results in thin resin portions 32 and 42 on the surface of the metal magnetic particles 31 and 41. This means that the resin portions 32 and 42 respectively fill only a small part of the gaps 34 between the metal magnetic particles 31 and the gaps 44 between the metal magnetic particles 41. If the resin solution before curing has a too high viscosity, on the other hand, its poor wettability makes it difficult for the resin to wet the metal magnetic particles 31 and 41 and spread in the gaps 34 between the metal magnetic particles 31 and the gaps 44 between the metal magnetic particles 41. This means that the resin portions 32 and 42 respectively fill only a small part of the gaps 34 between the metal magnetic particles 31 and the gaps 44 between the metal magnetic particles 41. Accordingly, the resin to be injected between the metal magnetic particles 31 and between the metal magnetic particles 41 is selected such that its viscosity allows it to sufficiently fill the gaps 34 between the metal magnetic particles 31 and the gaps 44 between the metal magnetic particles 41.

In one or more embodiments, a part of the gaps between the metal magnetic particles may not be closed by the resin portion and such not-closed regions are left as voids. In the embodiment shown in FIG. 4, voids 33, which are not closed by the resin portion 32, are present in the gaps 34 between the metal magnetic particles 31 in the first region 10A, and voids 43, which are not closed by the resin portion 42, are present in the gaps 44 between the metal magnetic particles 41 in the second region 10B. Some or all of the gaps 34 in the first region 10A may be entirely closed by the resin portion 32. In other words, no voids 33 may be present in some or all of the gaps 34 in the first region 10A. Likewise, some of the gaps 44 in the second region 10B may be entirely closed by the resin portion 42. In other words, no voids 43 may be present in some of the gaps 44 in the second region 10B. Similarly in the third region 10C, voids, which are not closed by the resin, are present in the gaps between the metal magnetic particles. As noted, the base body 10 has voids such as the voids 33 and 43 formed therein.

As used herein, the term "an area void ratio" refers to the ratio of the area of the voids in a predetermined region in a cross-section of the base body 10. The area of the voids in a cross-section of the base body 10 is calculated in the following manner, for example. In order to calculate the area void ratio, the base body 10 is cut in the thickness direction (the T-axis direction) to expose a cross-section, and an image of the cross-section is captured using a scan electron microscope (SEM) with a predetermined magnification factor (for example, a magnification factor of 1000). In this way, an SEM image showing as an observation field a part of the cross-section of the base body 10 is captured. The captured SEM image is then subjected to image processing such as binarization, so that voids and non-void regions are distinguished from each other and the areas of the regions classified as the voids are calculated. The binarization may be replaced with multi-value processing. The thus calculated areas of the voids in the observation field are summed up, and the total area of the voids in the observation field is divided by the area of the observation field. In this manner, the area void ratio is calculated. The area void ratio, which is represented in percentage, is represented by the following expression.

Area void ratio (%)=(Total area of voids in observation field/Total area of observation field)×100

In one or more embodiments, the first region 10A has a lower area void ratio than the second region 10B. As described above, in one or more embodiments, the gaps 34 between the metal magnetic particles 31 in the first region 10A have a smaller area than the gaps 44 between the metal magnetic particles 41 in the second region 10B. Here, a resin is introduced between the metal magnetic particles 31 and between the metal magnetic particles 41, so that the resin wets the particles 31 and 41 and spreads between the metal magnetic particles 31 and between the metal magnetic particles 41. This can form a resin film having a generally uniform thickness on the surface of the metal magnetic particles 31 and 41. The resin film can be divided into the resin portion 32 formed on the surface of the metal magnetic particles 31 and the resin portion 42 formed on the surface of the metal magnetic particles 41. As noted, the resin portion 32 is formed in the gaps 34 between the metal magnetic particles 31, and the resin portion 42, which has the same or substantially the same thickness as the resin portion 32, is formed in the gaps 44 between the metal magnetic particles 41. Accordingly, the ratio of the voids 33 in the gaps 34 can be less than the ratio of the voids 43 in the gaps 44. If all of the gaps 34 between the metal magnetic particles 31 are closed by the resin portion 32 in the first region 10A, the area void ratio of the first region 10A is zero. The area gap ratio of the first region 10A may be zero.

In one or more embodiments, the third region 10C has a higher area void ratio than the second region 10B. In one or more embodiments, the third region 10C has a lower area void ratio than the second region 10B and higher than the first region 10A.

In one or more embodiments, if the first region 10A has a lower area void ratio than the second region 10B, the amount of resin per unit volume can be greater in the first region 10A than in the second region 10B.

In the embodiment shown, the area void ratio and the area of the gaps 33 and 43 are calculated using the cross-section obtained by cutting the base body 10 in the thickness direction but can be calculated using the cross-section passing through the internal conductor 25 and extending along the direction other than the thickness direction. Various dimensions other than the area void ratio and the area of the gaps 33 and 43 can be also calculated using the cross-section obtained by cutting the base body 10 along a plane passing through the internal conductor 25.

The following now describes a method of manufacturing the coil component 1 relating to one or more embodiments. A first magnetic paste is first made by mixing and kneading together the metal magnetic particles 31 and a binder resin. The binder resin can be selected from resins that are highly pyrolytic and can be easily debindered, for example, a butyral or acrylic resin. The first magnetic paste is then applied to a part of the surface of a plastic base film using known techniques such as a doctor blade method and screen printing and the applied first magnetic paste is dried, so that a paste body made of the first magnetic paste is obtained. The paste body made from the first magnetic paste constitutes a part of the first region 10A after fired.

On the paste body made in the above manner, a conductor paste containing a conductor metal is printed by screen printing or the like, to form an unfired conductor pattern. The conductor metal contained in the conductor paste is at least one selected from the group consisting of, for example, Ag, an Ag alloy, Cu and a Cu alloy. The unfired conductor pattern is formed into the internal conductor 25 after fired.

Subsequently, onto the top surface of the unfired conductor pattern made in the above manner and onto a region of the top surface of the above-described paste body made of the first magnetic paste that surrounds the unfired conductor pattern, the first magnetic paste is applied using known techniques such as screen printing and dried. The first magnetic paste applied in this step is formed into a part of the first region 10A after fired. In this manner, a laminated body made of the first magnetic paste is obtained that has the unfired conductor pattern formed therein.

Subsequently, the metal magnetic particles 41 and a binder resin are mixed and kneaded to make a second magnetic paste, which is then applied onto the base film. The second magnetic paste is applied onto the top surface of the base film to surround the laminated body made of the first magnetic paste using known techniques such as screen printing. The applied second magnetic paste is dried, so that a paste body made of the second magnetic paste is obtained. The paste body made of the second magnetic paste in this manner constitutes a part of the second region 10B after fired. In this manner, a first intermediate body is obtained that includes the laminated body made of the first magnetic paste and the second magnetic paste surrounding the laminated body, and the laminated body has the unfired conductor pattern formed therein.

After this, a third magnetic paste is made by mixing and kneading together metal magnetic particles and a binder resin. The metal magnetic particles contained in the third magnetic paste may be the same as the metal magnetic particles 41, or different from the metal magnetic particles 41 in terms of the composition and particle size. The third magnetic paste is then applied onto the base film, which has been made in the above-described manner. The third magnetic paste is applied onto the top surface of the base film to surround the first intermediate body using known techniques such as screen printing. The applied third magnetic paste is dried, so that a paste body made of the third magnetic paste is obtained. The paste body made of the third magnetic paste constitutes a part of the third region 10C of the final product or coil component 1, more specifically, a part of the third region 10C that defines the side surfaces 10*e* and 10*f* of the base body and a part of the end surfaces 10*c* and 10*d* of the base body. In one or more embodiments, the base body 10 may not necessarily include the third region 10C, and the third region 10C may be provided only on the top and bottom surfaces 10*a* and 10*b* of the base body and may not be provided on the end surfaces 10*c* and 10*d* and the side surfaces 10*e* and 10*f*. In one or more embodiments, the third region 10C may be provided only on a part of the side surfaces 10*e* and 10*f* and the end surfaces 10*c* and 10*d*. If such is the case, the third magnetic paste is not applied onto a part of the region surrounding the first intermediate body where the third region 10C is absent, and the third magnetic paste is applied only onto a part corresponding to the surface on which the third region 10C is provided. In this manner, a second intermediate body is obtained that includes the laminated body made of the first magnetic paste, the paste body made of the second magnetic paste surrounding the laminated body, and the third magnetic paste provided outside the paste body made of the second magnetic paste, and the laminated body has the unfired conductor pattern formed therein. Following this, the base film is peeled off the second intermediate body.

After this, the second magnetic paste is applied onto the top surface of the second intermediate body, and the applied second magnetic paste is dried into a paste body. Subsequently, the third magnetic paste is applied to surround the paste body made of the second magnetic paste on the top surface of the second intermediate body, and the applied third magnetic paste is dried into a paste body. The paste body made of the third magnetic paste constitutes, after fired, a part of a portion of the third region 10C that is positioned on the side surfaces 10*e* and 10*f* of the base body and on the end surfaces 10*c* and 10*d* of the base body. After this, on the paste body made of the second magnetic paste applied onto the second intermediate body and on the paste body made of the third magnetic paste applied to surround the paste body made of the second magnetic paste, the third magnetic paste is further applied, and the applied third magnetic paste is dried into a paste body. This paste body made of the third magnetic paste constitutes, after fired, a part of the third region 10C that is positioned on the top surface 10*a* of the base body. In one or more embodiments, the third region 10C may not be provided on the top surface 10*a*. In one or more embodiments, the third region 10C may be provided only on a part of the top surface 10*a*. If such is the case, the third magnetic paste is not applied onto a part of the base body 10 where the third region 10C is absent, and the third magnetic paste is applied only onto a part of the base body 10 where the third region 10C is provided.

After this, the second intermediate body is turned upside down, and, in the same manner as described above, the second magnetic paste is applied onto the second intermediate body and dried, and the third magnetic paste is applied to surround this second magnetic paste and dried, so that a paste body is obtained. This paste body made of the third magnetic paste constitutes, after fired, a part of a portion of the third region 10C that is positioned on the side surfaces 10*e* and 10*f* of the base body and on the end surfaces 10*c* and 10*d* of the base body. After this, on the second magnetic paste and the third magnetic paste applied onto the second intermediate body that has been turned upside down, the third magnetic paste is further applied, and the applied third magnetic paste is dried into a paste body. This paste body made of the third magnetic paste constitutes, after fired, a part of the third region 10C that is positioned on the bottom surface 10*b* of the base body. The third region 10C may not be provided on the bottom surface 10*b*. In one or more embodiments, the third region 10C may be provided only on a part of the bottom surface 10*b*. If such is the case, the third magnetic paste is not applied onto a part of the base body 10 where the third region 10C is absent, and the third magnetic paste is applied only onto a part of the base body 10 where the third region 10C is provided. In the above-described manner, a third intermediate body is produced. In the third intermediate body made in the above manner, the paste body made of the first magnetic paste is provided outside the unfired conductor pattern, which is to be formed into the internal conductor 25, and the paste body made of the second magnetic paste is provided outside the paste body made of the first magnetic paste. In one or more embodiments, the paste body made of the third magnetic paste is provided outside the paste body made of the second magnetic paste. As described above, the paste body made of the third magnetic paste can be entirely or partially saved.

Next, the above-described third intermediate body is segmented into chips using a cutter such as a dicing machine or a laser processing machine, and the chips of the third intermediate body are subjected to thermal treatment, so that a fired body is obtained. The thermal treatment is performed at a temperature of 600 to 900° C. in an oxygen-containing atmosphere, for example. The thermal treatment can form, on the surface of the metal magnetic particles in each of the first to third magnetic pastes, an insulating film or an oxide of the ingredients of the metal magnetic particles, and the insulating film can bind together the adjacent ones of the metal magnetic particles. In the fired body, spaces (gaps) are provided between the metal magnetic particles. During the thermal treatment, degreasing may be performed separately from the thermal treatment, or the thermal treatment may involve degreasing.

Following this, the fired body made in the above manner is subjected to impregnation. In the impregnation, the fired body is immersed into an impregnation solution made of a resin material. The impregnation solution contains, for example, a thermosetting resin. If the fired body is immersed in the impregnation solution, the impregnation solution wets the metal magnetic particles and spreads along the surface of the metal magnetic particles in the fired body, so that the impregnation solution fills the gaps between the metal magnetic particles. The impregnation can include atmospheric impregnation and additionally vacuum impregnation or pressure impregnation. After the gaps between the metal magnetic particles are filled with the impregnation solution in this manner, the resin in the impregnation solution is cured. As a result, the resin portion including the resin portions 32 and 42 is formed in the gaps between the metal magnetic particles. In the above-described manner, the base body 10 having the first, second and third regions 10A, 10B and 10C is obtained.

Next, the external electrodes 21 and 22 are formed on the respective ends of the base body 10 obtained in the above-described manner. The external electrodes 21 and 22 can be formed such that a conductor paste containing Ag particles is applied to form an underlying electrode and a plating layer is formed on the surface of the underlying electrode, for example. The plating layer may be constituted by, for example, two layers including a nickel plating layer containing nickel and a tin plating layer containing tin. The external electrodes 21 and 22 are electrically connected to the ends of the internal conductor 25 provided in the base body 10. The coil component 1 is obtained in the above-described manner.

The above-described manufacturing method can be modified by omitting some of the steps, adding steps not explicitly described, and/or reordering the steps. Such omission, addition, or reordering is also included in the scope of the present invention unless diverged from the purport of the present invention.

The coil component 1 can be made in different manners than the method described above. The coil component 1 may be made using other methods than the above, such as the laminating process, thin film process or compression shaping process.

Figure 5:
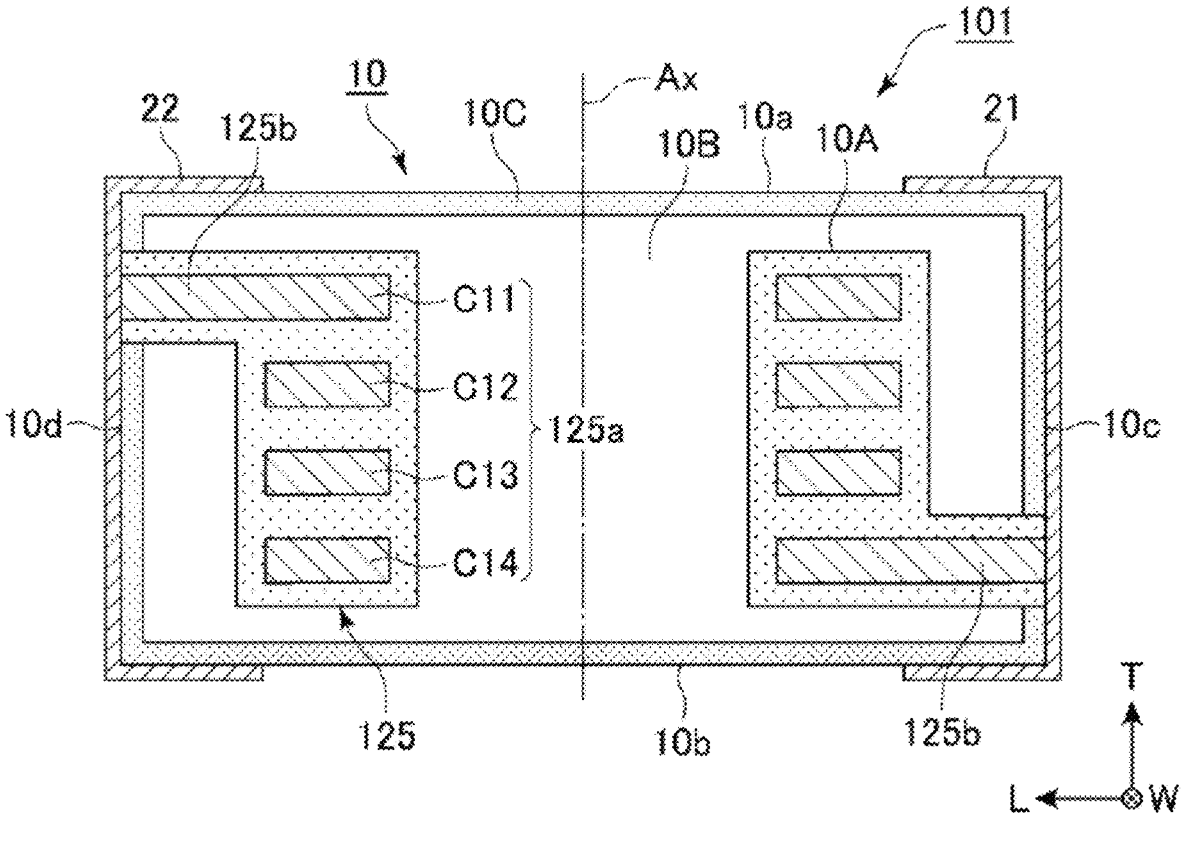
FIG. 5 schematically illustrates a cross-section of a coil component according to another embodiment of the present invention along the line I-I.
Figure 6:
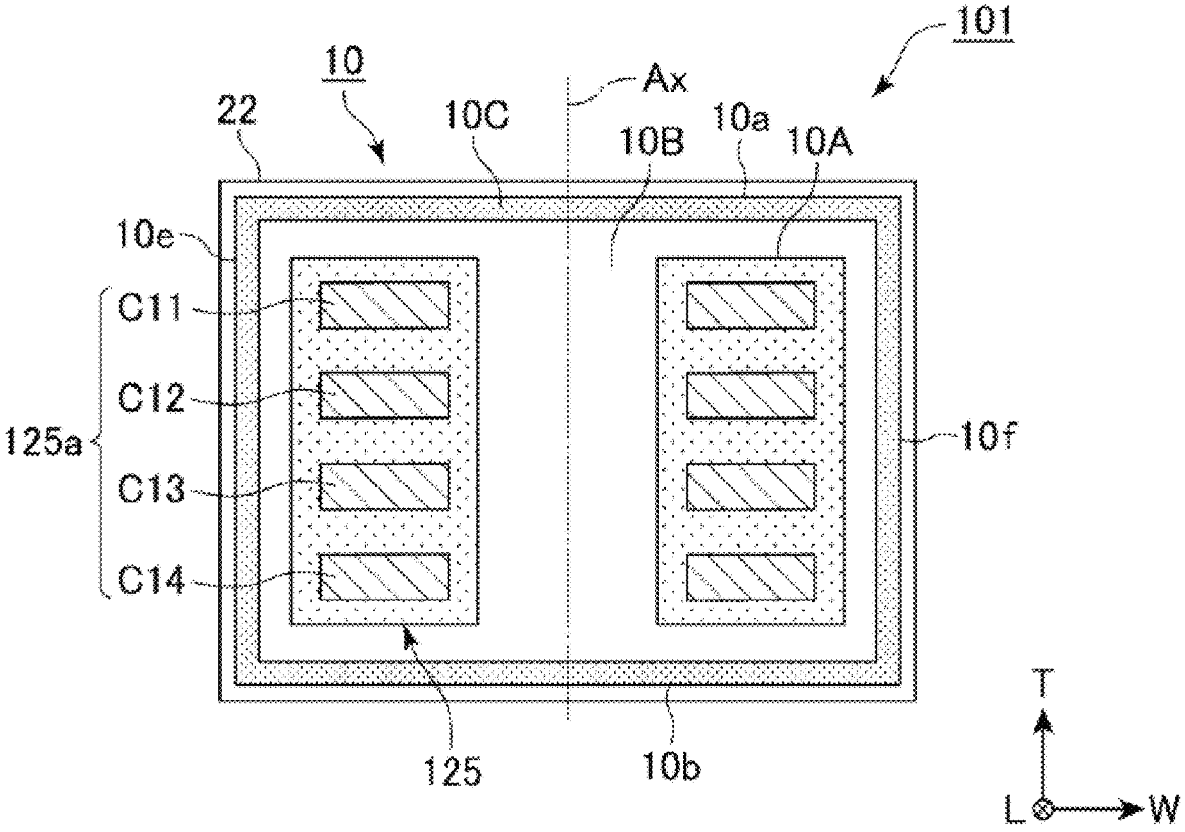
FIG. 6 schematically shows a cross-section of the coil component of FIG. 5 along the line II-II.

Next, a coil component 101 relating to another embodiment of the present invention will be described with reference to FIGS. 5 and 6. The coil component 101 is different from the coil component 1 in that it includes an internal conductor 125 instead of the internal conductor 25.

The internal conductor 125 includes a winding portion 125*a* and lead-out conductors 125*b*. The winding portion 125*a* is wound spirally around a coil axis Ax extending along the thickness direction (the T-axis direction), and the lead-out conductors 125*b* are led out from the opposite ends of the winding portion 125*a* to connect the opposite ends to the external electrodes 21 and 22, respectively.

The winding portion 125*a* is constituted by conductor patterns C11 to C14. The conductor patterns C11 to C14 are formed by, for example, printing a conductive paste made of a highly conductive metal or alloy onto a magnetic sheet via screen printing and heating the conductive paste printed on the magnetic sheet. The conductive paste may be made by mixing and kneading Ag, Pd, Cu, Al, or alloys thereof and a resin. A via is formed in the magnetic sheet on which the conductive paste is applied. The via is formed by forming a through-hole in the magnetic sheet at a predetermined location so as to extend through the magnetic sheet in the T axis direction and then filling the through-hole with the conductive paste. Each of the conductor patterns C11 to C14 is electrically connected to the respective adjacent conductor patterns through the vias. The conductor patterns C11 to C14 connected in this manner form the spiral internal conductor 125.

In one or more embodiments, the internal conductor 125 is provided in the first region 10A of the base body 10. In other words, the first region 10A encloses the internal conductor 125 therein.

The coil component 101 may be made using the laminating process, thin film process or compression shaping process, like the coil component 1.

Figure 7:
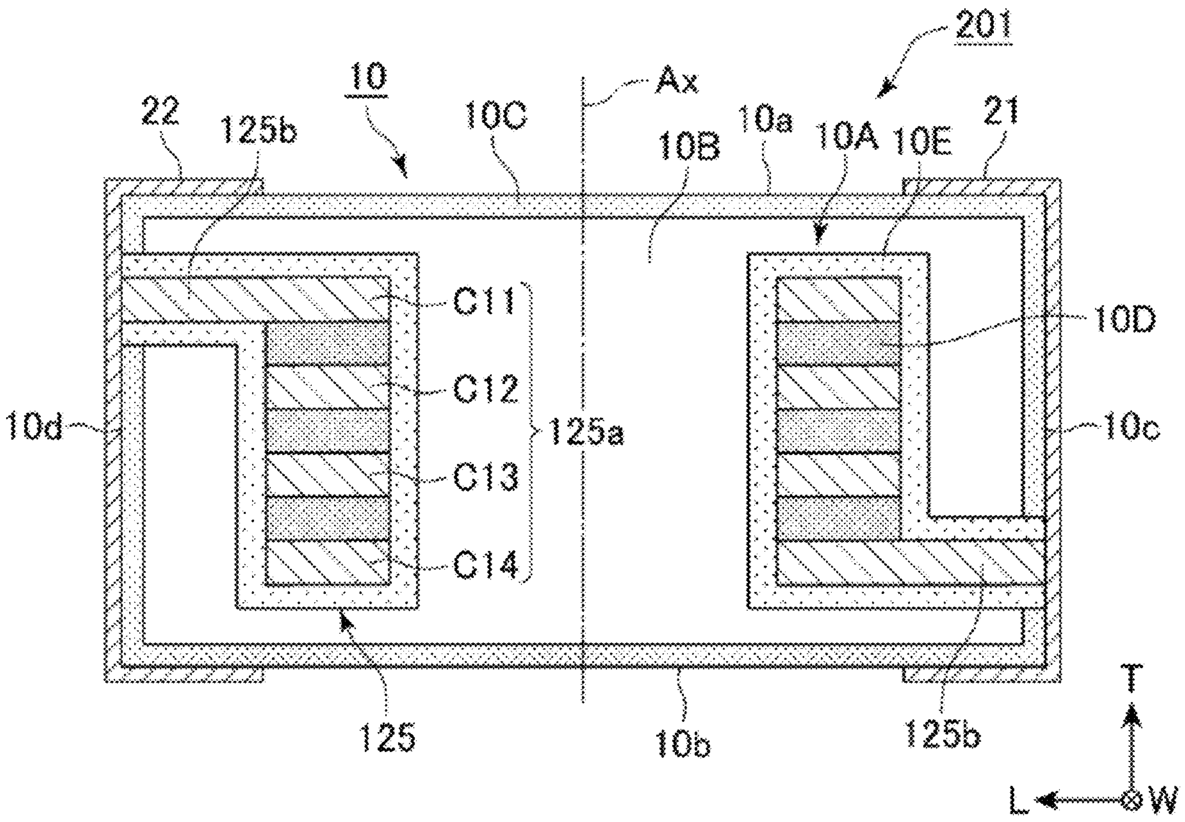
FIG. 7 schematically illustrates a cross-section of a coil component according to another embodiment of the present invention along the line I-I.
Figure 8:
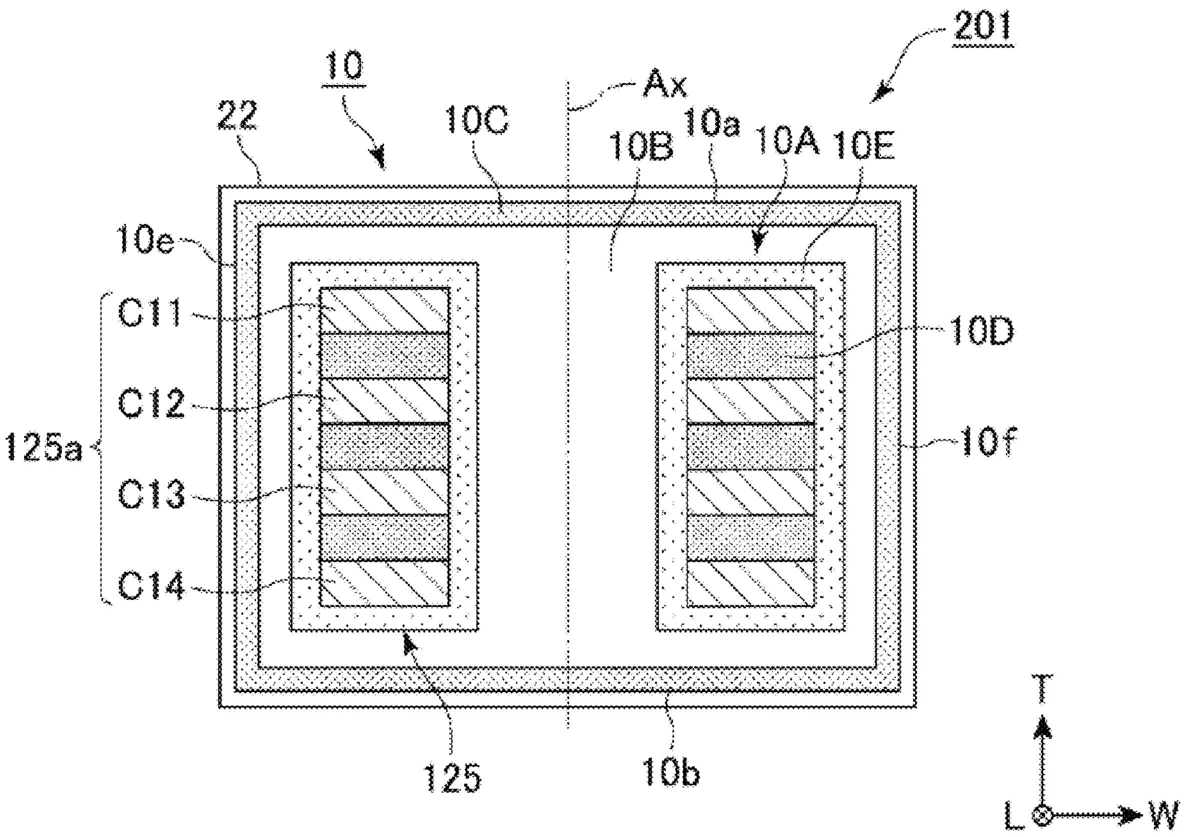
FIG. 8 schematically shows a cross-section of the coil component of FIG. 7 along the line II-II.

Next, a coil component 201 relating to another embodiment of the present invention will be described with reference to FIGS. 7 and 8. The coil component 201 is different from the coil component 101 in that the first region 10A of the base body 10 includes an inter-conductor region 10D and a conductor surrounding region 10E.

The first region 10A of the base body 10 encloses the internal conductor 125 therein. In the embodiment shown, the first region 10A includes the inter-conductor region 10D between, in the direction along the coil axis Ax, adjacent ones of the conductor patterns C11 to C14 constituting the internal conductor 125 and the conductor surrounding region 10E excluding the inter-conductor region 10D. In FIGS. 7 and 8, at least a part of the inter-conductor region 10D is positioned between the conductor pattern C11 and the conductor pattern C12, between the conductor pattern C12 and the conductor pattern C13, and between the conductor pattern C13 and the conductor pattern C14. The conductor patterns C11 to C14 are each wound less than one turn around the coil axis Ax. This means that a part of the conductor pattern C11 opposes, in the direction along the coil axis Ax, not the conductor pattern C12, which is one layer below the conductor pattern C11 but the conductor pattern C13, which is two layers below the conductor pattern C11. In other words, a part of the conductor pattern C11 is adjacent to the conductor pattern C13. A part of the inter-conductor region 10D may be provided between a part of the conductor pattern C11 adjacent to the conductor pattern C13 and the conductor pattern C13. The conductor patterns C12 to C14 may each also have a portion adjacent not to a conductor pattern that is one layer above or below it, but to a conductor pattern that is two layers above or below it.

In the coil component 201, the first region 10A partially or entirely has a lower area void ratio than the second region 10B. For example, the area void ratio may be lower in the inter-conductor region 10D of the first region 10A than in the second region 10B, and the area void ratio is lower in the conductor surrounding region 10D than in the third region 10C. In one or more embodiments, the area void ratio is lower in the conductor surrounding region 10E than in the second region 10B and than in the third region 10C. In another embodiment, the conductor surrounding region 10E may have a higher area void ratio than the second region 10B.

The coil component 201 may be made using the laminating process, thin film process or compression shaping process, like the coil component 1.

Next, advantageous effects of the foregoing embodiments will be described. According to one or more embodiments of the present invention, in the base body 10, the voids 33 account for a low ratio in the first region 10A surrounding the internal conductor 25. This makes it difficult for foreign matters to intrude into the first region 10A from outside the base body 10. Accordingly, one or more embodiments can reduce degradation in magnetic characteristics such as permeability and a drop in resistivity in the first region 10A.

According to one or more embodiments of the present invention, in the base body 10, the ratio of the voids 43 in the second region 10B enclosing the first region 10A therein is higher than the ratio of the voids 33 in the first region 10A. Accordingly, even if a sufficient amount of resin is introduced into the base body 10 to fill the gaps 34 between the metal magnetic particles 31 in the first region 10A, the gaps 44 between the metal magnetic particles 41 in the second region 10B can absorb therein an excess of the resin.

According to one or more embodiments of the present invention, the ratio of the voids in the third region 10C defining the outer surface of the base body 10 is higher than the ratio of the voids 33 in the first region 10A. Accordingly, even if a sufficient amount of resin is introduced into the base body 10 to fill the gaps 34 between the metal magnetic particles 31 in the first region 10A, the gaps between the metal magnetic particles in the third region 10C can absorb therein an excess of the resin in the vicinity of the surface of the base body 10.

As described above, one or more embodiments of the present invention can prevent the resin from adhering to the outer surface of the base body 10, which can prevent any failures caused by the resin adhering to the outer surface of the base body. Accordingly, in the coil components 1 and 101 relating to one or more embodiments of the present invention, foreign matters can be prevented from intruding into the first region 10A, which may greatly affect the magnetic characteristics and insulation reliability of the coil components 1 and 101, while the resin can be prevented from adhering to the outer surface of the base body 10.

In the coil component 201 relating to one or more embodiments of the present invention, foreign matters can be prevented from intruding into the inter-conductor region 10D, which may greatly affect the insulation reliability of the coil component 201, while the resin can be prevented from adhering to the outer surface of the base body 10.

According to one or more embodiments of the present invention, when observed before the resin is injected between the metal magnetic particles in the base body 10, the gaps 34 between the metal magnetic particles 31 in the first region 10A are smaller than the gaps 44 between the metal magnetic particles 41 in the second region 10B. Accordingly, when the resin is introduced between the metal magnetic particles, the gaps 34 between the metal magnetic particles 31 in the first region 10A are more quickly closed by the resin introduced than the gaps 44 between the metal magnetic particles 41 in the second region 10B. For this reason, many of the gaps 34 between the metal magnetic particles 31 in the first region 10A can be closed without the need of injecting an excessive amount of the resin, which can cause the resin to adhere to the surface of the base body 10.

In one or more embodiments of the present invention, the inter-conductor region 10D between the conductor patterns of the internal conductor 125 has a lower area void ratio than the other region (for example, the second region 10B) in the base body 10. This makes it difficult for foreign matters to intrude into the inter-conductor region 10D. If foreign matters intrude into the inter-conductor region 10D, electro ion migration may take place depending on the type of the intruding foreign matters. This can result in degraded insulation reliability of the inter-conductor region 10D in the internal conductor 125. In one or more embodiments of the present invention, a low area void ratio is achieved in the inter-conductor region 10D. This can prevent foreign matters from intruding into the inter-conductor region 10D, thereby preventing electro ion migration.

In one or more embodiments of the present invention, the third region 10C, which is provided on the surface of the base body 10, has a higher area void ratio than the second region 10B. Accordingly, the voids in the third region 10C can absorb more of an excess of the resin.

In one or more embodiments of the present invention, the third region 10C, which is provided on the surface of the base body 10, has a lower area void ratio than the second region 10B. Accordingly, when applied onto the surface of the base body 10 in order to make the external electrodes 21 and 22, the conductive paste can be prevented from intruding into the base body 10.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments.

What is claimed is:

1. A coil component comprising:

a base body containing a plurality of metal magnetic particles, a resin portion between the metal magnetic particles and a void, the base body including a first region and a second region surrounding the first region, a second area void ratio of the second region being higher than a first area void ratio of the first region, the base body including surfaces defining an outer periphery of the base body, the surfaces including a first surface and a second surface opposite to each other;

an internal conductor disposed within the first region of the base body, the internal conductor extending linearly from the first surface to the second surface, the internal conductor having a first lead-out portion and a second lead-out portion, the first lead-out portion extending to the first surface of the base body, the second lead-out portion extending to the second surface of the base body, the first and second lead-out portions fully enclosed by the first region;

a first external electrode electrically connected to an end of the first lead-out portion; and a second external electrode electrically connected to an end of the second lead-out portion, wherein the base body includes a third region having (i) a third area void ratio higher than the second area void ratio or (ii) a third area void ratio higher than the first area void ratio and lower than the second area void ratio, and wherein the first surface of the base body is defined by the third region and a part of the first region enclosing the first lead-out portion, and the second surface of the base body is defined by the third region and a part of the first region enclosing the second lead-out portion.

2. The coil component of claim 1, wherein a space between the metal magnetic particles in the first region in a cross-section passing through the internal conductor has a smaller area than a space between the metal magnetic particles in the second region in the cross-section.

3. The coil component of claim 1, wherein the metal magnetic particles contain an oxide of an element constituting the metal magnetic particles.

4. The coil component of claim 1, wherein an amount of a resin per unit volume is greater in the first region than in the second region.

5. A circuit board comprising the coil component of claim 1.

6. An electronic device comprising the circuit board of claim 5.

7. A coil component comprising:

an internal conductor including a winding portion extending around a coil axis, the internal conductor including a first conductor pattern and a second conductor pattern facing the first conductor pattern in a direction along the coil axis, the internal conductor having first and second lead-out portions;

a base body containing a plurality of metal magnetic particles, a resin portion between the metal magnetic particles and a void, the base body including a first region and a second region surrounding the first region, the first region including an inter-conductor region between the first conductor pattern and the second conductor pattern, the first region enclosing the internal conductor therein, the base body including surfaces defining an outer periphery of the base body, the surfaces including a first surface and a second surface opposite to each other to which the first and second lead-out portions of the internal conductor extend, the first and second lead-out portions fully enclosed by the first region, a second area void ratio of the second region being higher than a first area void ratio of the first region;

a first external electrode electrically connected to an end of the first lead-out portion; and a second external electrode electrically connected to an end of the second lead-out portion, wherein the base body includes a third region having (i) a third area void ratio higher than the second area void ratio or (ii) a third area void ratio higher than the first area void ratio and lower than the second area void ratio, wherein the first surface of the base body is defined by the third region and a part of the first region enclosing the first lead-out portion, and the second surface of the base body is defined by the third region and a part of the first region enclosing the second lead-out portion, and wherein the base body includes a surrounded portion surrounded by the winding portion of the internal conductor, at least part of the second region being disposed in the surrounded portion of the base body.

8. The coil component of claim 7, wherein a space between the metal magnetic particles in the first region in a cross-section passing through the internal conductor has a smaller area than a space between the metal magnetic particles in the second region in the cross-section.

9. The coil component of claim 7, wherein the metal magnetic particles contain an oxide of an element constituting the metal magnetic particles.

10. The coil component of claim 7, wherein an amount of a resin per unit volume is greater in the first region than in the second region.

11. A circuit board comprising the coil component of claim 7.

12. An electronic device comprising the circuit board of claim 11.

* * * * *